(12) United States Patent
Galbo et al.

(10) Patent No.: US 9,213,606 B2
(45) Date of Patent: *Dec. 15, 2015

(54) IMAGE RESCUE

(75) Inventors: Neal Anthony Galbo, Boca Raton, FL (US); Berhanu Iman, Sunyvale, CA (US); Ngon Le, Santa Clara, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,594

(22) Filed: Apr. 20, 2012

(65) Prior Publication Data

US 2012/0204192 A1    Aug. 9, 2012

Related U.S. Application Data

(60) Division of application No. 11/654,290, filed on Jan. 16, 2007, now Pat. No. 8,166,488, which is a continuation of application No. 10/371,930, filed on Feb. 21, 2003, now Pat. No. 7,231,643.

(60) Provisional application No. 60/359,510, filed on Feb. 22, 2002.

(51) Int. Cl.
*G06F 3/00* (2006.01)
*G06F 9/44* (2006.01)
(Continued)

(52) U.S. Cl.
CPC .......... *G06F 11/1435* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | |
|---|---|---|
| 4,099,069 A | 7/1978 | Cricchi et al. |
| 4,130,900 A | 12/1978 | Watanabe |

(Continued)

FOREIGN PATENT DOCUMENTS

| | | |
|---|---|---|
| AU | 0 557 723 | 1/1987 |
| EP | 0 220 718 | 5/1987 |

(Continued)

OTHER PUBLICATIONS

Mendel Rosenblum and John K. Ousterhout, The Design and Implementation of a Log-Structured File System, article, 1991, 15 pgs., Berkeley, USA.

(Continued)

*Primary Examiner* — Diem Cao
(74) *Attorney, Agent, or Firm* — Dicke, Billig & Czaja, PLLC

(57) ABSTRACT

An image rescue system includes an application program for communication with a mass storage device, the application program being in communication with an operating system layer for accessing the mass storage device to read and write information. The image rescue system further includes a device driver in communication with the application program, the operating system layer and the mass storage device, the device driver for allowing the application program to access the mass storage device to read and write information by bypassing the operating system layer, the device driver for communicating with the mass storage device to allow the application program to access information in the mass storage device considered damaged by the operating system layer, the damaged information being inaccessible to the operating system layer, wherein the image rescue system accesses the mass storage device to retrieve and recover information accessible and inaccessible to the operating system layer.

18 Claims, 2 Drawing Sheets

(51) Int. Cl.
  *G06F 9/46*     (2006.01)
  *G06F 13/00*    (2006.01)
  *G06F 11/14*    (2006.01)
  *G06F 3/06*     (2006.01)

(56)              References Cited

U.S. PATENT DOCUMENTS

| | | |
|---|---|---|
| 4,210,959 A | 7/1980 | Wozniak |
| 4,309,627 A | 1/1982 | Tabata |
| 4,355,376 A | 10/1982 | Gould |
| 4,398,248 A | 8/1983 | Hsia et al. |
| 4,405,952 A | 9/1983 | Slakmon |
| 4,414,627 A | 11/1983 | Nakamura |
| 4,450,559 A | 5/1984 | Bond et al. |
| 4,456,971 A | 6/1984 | Fukuda et al. |
| 4,468,730 A | 8/1984 | Dodd et al. |
| 4,473,878 A | 9/1984 | Zolnowsky et al. |
| 4,476,526 A | 10/1984 | Dodd |
| 4,498,146 A | 2/1985 | Martinez |
| 4,525,839 A | 6/1985 | Nozawa et al. |
| 4,532,590 A | 7/1985 | Wallach et al. |
| 4,609,833 A | 9/1986 | Guterman |
| 4,616,311 A | 10/1986 | Sato |
| 4,654,847 A | 3/1987 | Dutton |
| 4,710,871 A | 12/1987 | Belknap et al. |
| 4,746,998 A | 5/1988 | Robinson et al. |
| 4,748,320 A | 5/1988 | Yorimoto et al. |
| 4,757,474 A | 7/1988 | Fukushi et al. |
| 4,774,700 A | 9/1988 | Satoh et al. |
| 4,780,855 A | 10/1988 | Iida et al. |
| 4,788,665 A | 11/1988 | Fukuda et al. |
| 4,797,543 A | 1/1989 | Watanabe |
| 4,800,520 A | 1/1989 | Iijima |
| 4,829,169 A | 5/1989 | Watanabe |
| 4,843,224 A | 6/1989 | Ohta et al. |
| 4,896,262 A | 1/1990 | Wayama et al. |
| 4,914,529 A | 4/1990 | Bonke |
| 4,920,518 A | 4/1990 | Nakamura et al. |
| 4,924,331 A | 5/1990 | Robinson et al. |
| 4,943,745 A | 7/1990 | Watanabe et al. |
| 4,953,122 A | 8/1990 | Williams |
| 4,970,642 A | 11/1990 | Yamamura |
| 4,970,727 A | 11/1990 | Miyawaki et al. |
| 5,070,474 A | 12/1991 | Tuma et al. |
| 5,093,785 A | 3/1992 | Iijima |
| 5,168,465 A | 12/1992 | Harari |
| 5,198,380 A | 3/1993 | Harari |
| 5,200,959 A | 4/1993 | Gross et al. |
| 5,218,695 A | 6/1993 | Noveck et al. |
| 5,220,518 A | 6/1993 | Haq |
| 5,226,168 A | 7/1993 | Kobayashi et al. |
| 5,227,714 A | 7/1993 | Lou |
| 5,253,351 A | 10/1993 | Yamamoto et al. |
| 5,267,218 A | 11/1993 | Elbert |
| 5,268,318 A | 12/1993 | Harari |
| 5,268,870 A | 12/1993 | Harari |
| 5,270,979 A | 12/1993 | Harari et al. |
| 5,293,560 A | 3/1994 | Harari |
| 5,303,198 A | 4/1994 | Adachi et al. |
| 5,305,276 A | 4/1994 | Uenoyama |
| 5,305,278 A | 4/1994 | Inoue |
| 5,315,541 A | 5/1994 | Harari et al. |
| 5,315,558 A | 5/1994 | Hag |
| 5,329,491 A | 7/1994 | Brown et al. |
| 5,337,275 A | 8/1994 | Garner |
| 5,341,330 A | 8/1994 | Wells et al. |
| 5,341,339 A | 8/1994 | Wells |
| 5,341,341 A | 8/1994 | Fukuzo |
| 5,353,256 A | 10/1994 | Fandrich et al. |
| 5,357,475 A | 10/1994 | Hasbun et al. |
| 5,359,569 A | 10/1994 | Fujita et al. |
| 5,365,127 A | 11/1994 | Manley |
| 5,369,615 A | 11/1994 | Harari et al. |
| 5,371,702 A | 12/1994 | Nakai et al. |
| 5,381,539 A | 1/1995 | Yanai et al. |
| 5,382,839 A | 1/1995 | Shinohara |
| 5,384,743 A | 1/1995 | Rouy |
| 5,388,083 A | 2/1995 | Assar et al. |
| 5,396,468 A | 3/1995 | Harari et al. |
| 5,404,485 A | 4/1995 | Ban |
| 5,406,527 A | 4/1995 | Honma |
| 5,418,752 A | 5/1995 | Harari et al. |
| 5,422,842 A | 6/1995 | Cernea et al. |
| 5,422,856 A | 6/1995 | Sasaki et al. |
| 5,428,621 A | 6/1995 | Mehrotra et al. |
| 5,430,682 A | 7/1995 | Ishikawa et al. |
| 5,430,859 A | 7/1995 | Norman et al. |
| 5,431,330 A | 7/1995 | Wieres |
| 5,434,825 A | 7/1995 | Harari |
| 5,438,573 A | 8/1995 | Mangan et al. |
| 5,465,235 A | 11/1995 | Miyamoto |
| 5,465,338 A | 11/1995 | Clay |
| 5,471,478 A | 11/1995 | Mangan et al. |
| 5,473,765 A | 12/1995 | Gibbons et al. |
| 5,479,638 A | 12/1995 | Assar et al. |
| 5,485,595 A | 1/1996 | Assar et al. |
| 5,490,117 A | 2/1996 | Oda et al. |
| 5,495,442 A | 2/1996 | Cernea et al. |
| 5,504,760 A | 4/1996 | Harari et al. |
| 5,508,971 A | 4/1996 | Cernea et al. |
| 5,513,138 A | 4/1996 | Manabe et al. |
| 5,515,333 A | 5/1996 | Fujita et al. |
| 5,519,847 A | 5/1996 | Fandrich et al. |
| 5,523,980 A | 6/1996 | Sakui et al. |
| 5,524,230 A | 6/1996 | Sakaue et al. |
| 5,530,673 A | 6/1996 | Tobita et al. |
| 5,530,828 A | 6/1996 | Kaki et al. |
| 5,530,938 A | 6/1996 | Akasaka et al. |
| 5,532,962 A | 7/1996 | Auclair et al. |
| 5,532,964 A | 7/1996 | Cernea et al. |
| 5,534,456 A | 7/1996 | Yuan et al. |
| 5,535,328 A | 7/1996 | Harari et al. |
| 5,541,551 A | 7/1996 | Brehner et al. |
| 5,544,118 A | 8/1996 | Harari |
| 5,544,356 A | 8/1996 | Robinson et al. |
| 5,552,698 A | 9/1996 | Tai et al. |
| 5,554,553 A | 9/1996 | Harari |
| 5,563,825 A | 10/1996 | Cernea et al. |
| 5,566,314 A | 10/1996 | DeMarco et al. |
| 5,568,439 A | 10/1996 | Harari |
| 5,572,466 A | 11/1996 | Sukegawa |
| 5,579,502 A | 11/1996 | Konishi et al. |
| 5,581,723 A | 12/1996 | Hasbun et al. |
| 5,583,812 A | 12/1996 | Harari |
| 5,592,415 A | 1/1997 | Kato et al. |
| 5,592,420 A | 1/1997 | Cernea et al. |
| 5,596,526 A | 1/1997 | Assar et al. |
| 5,598,370 A | 1/1997 | Niijima et al. |
| 5,602,987 A | 2/1997 | Harari et al. |
| 5,603,001 A | 2/1997 | Sukegawa et al. |
| 5,606,660 A | 2/1997 | Estakhri et al. |
| 5,611,067 A | 3/1997 | Okamoto et al. |
| 5,640,528 A | 6/1997 | Harney et al. |
| 5,642,312 A | 6/1997 | Harari |
| 5,648,929 A | 7/1997 | Miyamoto |
| 5,663,901 A | 9/1997 | Wallace et al. |
| 5,671,442 A * | 9/1997 | Feeney et al. .............. 710/14 |
| 5,693,570 A | 12/1997 | Cernea et al. |
| 5,712,819 A | 1/1998 | Harari |
| 5,719,808 A | 2/1998 | Harari et al. |
| 5,723,990 A | 3/1998 | Roohparvar |
| 5,734,567 A | 3/1998 | Griffiths et al. |
| 5,745,418 A | 4/1998 | Ma et al. |
| 5,754,567 A | 5/1998 | Norman |
| 5,757,712 A | 5/1998 | Nagel et al. |
| 5,758,100 A | 5/1998 | Odisho |
| 5,761,117 A | 6/1998 | Uchino et al. |
| 5,768,190 A | 6/1998 | Tanaka et al. |
| 5,768,195 A | 6/1998 | Nakamura et al. |
| 5,773,901 A | 6/1998 | Kantner |
| 5,778,418 A | 7/1998 | Auclair et al. |
| 5,781,478 A | 7/1998 | Takeuchi et al. |
| 5,787,445 A | 7/1998 | Daberko |
| 5,787,484 A | 7/1998 | Norman |

(56) References Cited

U.S. PATENT DOCUMENTS

| | | |
|---|---|---|
| RE35,881 E | 8/1998 | Barrett et al. |
| 5,799,168 A | 8/1998 | Ban |
| 5,802,551 A | 9/1998 | Komatsu et al. |
| 5,809,515 A | 9/1998 | Kaki et al. |
| 5,809,558 A | 9/1998 | Matthews et al. |
| 5,809,560 A | 9/1998 | Schneider |
| 5,818,350 A | 10/1998 | Estakhri et al. |
| 5,818,781 A | 10/1998 | Estakhri et al. |
| 5,822,245 A | 10/1998 | Gupta et al. |
| 5,822,252 A | 10/1998 | Lee et al. |
| 5,822,781 A | 10/1998 | Wells et al. |
| 5,831,929 A | 11/1998 | Manning |
| 5,835,935 A | 11/1998 | Estakhri et al. |
| 5,838,614 A | 11/1998 | Estakhri et al. |
| 5,845,313 A | 12/1998 | Estakhri et al. |
| 5,847,552 A | 12/1998 | Brown |
| 5,860,083 A | 1/1999 | Sukegawa |
| 5,860,124 A | 1/1999 | Matthews et al. |
| 5,862,099 A | 1/1999 | Gannage et al. |
| 5,890,192 A | 3/1999 | Lee et al. |
| 5,901,086 A | 5/1999 | Wang et al. |
| 5,901,312 A | 5/1999 | Radko |
| 5,907,856 A | 5/1999 | Estakhri et al. |
| 5,909,586 A | 6/1999 | Anderson |
| 5,920,884 A | 7/1999 | Jennings, III et al. |
| 5,924,113 A | 7/1999 | Estakhri et al. |
| 5,928,370 A | 7/1999 | Asnaashari |
| 5,930,815 A | 7/1999 | Estakhri et al. |
| 5,933,368 A | 8/1999 | Ma et al. |
| 5,933,846 A | 8/1999 | Endo |
| 5,936,971 A | 8/1999 | Harari et al. |
| 5,937,425 A | 8/1999 | Ban |
| 5,953,737 A | 9/1999 | Estakhri et al. |
| 5,956,473 A | 9/1999 | Ma et al. |
| 5,959,926 A | 9/1999 | Jones et al. |
| 5,966,727 A | 10/1999 | Nishino |
| 5,974,439 A | 10/1999 | Bollella |
| 5,986,933 A | 11/1999 | Takeuchi et al. |
| 5,987,563 A | 11/1999 | Itoh et al. |
| 5,987,573 A | 11/1999 | Hiraka |
| 5,991,849 A | 11/1999 | Yamada et al. |
| 6,011,322 A | 1/2000 | Stumfall et al. |
| 6,011,323 A | 1/2000 | Camp |
| 6,018,265 A | 1/2000 | Keshtbod |
| 6,021,408 A | 2/2000 | Ledain et al. |
| 6,026,020 A | 2/2000 | Matsubara et al. |
| 6,026,027 A | 2/2000 | Terrell, II et al. |
| 6,029,179 A | 2/2000 | Kishi |
| 6,034,897 A | 3/2000 | Estakhri et al. |
| 6,035,357 A | 3/2000 | Sakaki |
| 6,040,997 A | 3/2000 | Estakhri |
| 6,047,307 A | 4/2000 | Radko |
| 6,047,352 A | 4/2000 | Lakhani et al. |
| 6,055,184 A | 4/2000 | Acharya et al. |
| 6,055,188 A | 4/2000 | Takeuchi et al. |
| 6,069,827 A | 5/2000 | Sinclair |
| 6,072,796 A | 6/2000 | Christensen et al. |
| 6,076,137 A | 6/2000 | Asnaashari |
| 6,081,447 A | 6/2000 | Lofgren et al. |
| 6,081,878 A | 6/2000 | Estakhri et al. |
| 6,084,483 A | 7/2000 | Keshtbod |
| 6,097,666 A | 8/2000 | Sakui et al. |
| 6,115,785 A | 9/2000 | Estakhri et al. |
| 6,122,195 A | 9/2000 | Estakhri et al. |
| 6,125,424 A | 9/2000 | Komatsu et al. |
| 6,125,435 A | 9/2000 | Estakhri et al. |
| 6,128,695 A | 10/2000 | Estakhri et al. |
| 6,134,145 A | 10/2000 | Wong |
| 6,134,151 A | 10/2000 | Estakhri et al. |
| 6,138,200 A * | 10/2000 | Ogilvie ......................... 710/244 |
| 6,141,249 A | 10/2000 | Estakhri et al. |
| 6,145,051 A | 11/2000 | Estakhri et al. |
| 6,151,247 A | 11/2000 | Estakhri et al. |
| 6,172,906 B1 | 1/2001 | Estakhri et al. |
| 6,173,291 B1 * | 1/2001 | Jenevein ............................ 1/1 |
| 6,173,362 B1 | 1/2001 | Yoda |
| 6,181,118 B1 | 1/2001 | Meehan et al. |
| 6,182,162 B1 | 1/2001 | Estakhri et al. |
| 6,202,138 B1 | 3/2001 | Estakhri et al. |
| 6,223,308 B1 | 4/2001 | Estakhri et al. |
| 6,226,708 B1 | 5/2001 | McGoldrick et al. |
| 6,230,234 B1 | 5/2001 | Estakhri et al. |
| 6,262,918 B1 | 7/2001 | Estakhri et al. |
| 6,272,610 B1 | 8/2001 | Katayama et al. |
| 6,275,436 B1 | 8/2001 | Tobita et al. |
| 6,279,069 B1 | 8/2001 | Robinson et al. |
| 6,279,114 B1 | 8/2001 | Toombs et al. |
| 6,285,607 B1 | 9/2001 | Sinclair |
| 6,327,639 B1 | 12/2001 | Asnaashari |
| 6,345,367 B1 | 2/2002 | Sinclair |
| 6,374,337 B1 | 4/2002 | Estakhri |
| 6,393,513 B2 | 5/2002 | Estakhri et al. |
| 6,397,314 B1 | 5/2002 | Estakhri et al. |
| 6,411,546 B1 | 6/2002 | Estakhri et al. |
| 6,467,021 B1 | 10/2002 | Sinclair |
| 6,490,649 B2 | 12/2002 | Sinclair |
| 6,567,307 B1 | 5/2003 | Estakhri |
| 6,578,127 B1 | 6/2003 | Sinclair |
| 6,587,382 B1 | 7/2003 | Estakhri et al. |
| 6,711,059 B2 | 3/2004 | Sinclair et al. |
| 6,725,321 B1 | 4/2004 | Sinclair et al. |
| 6,728,851 B1 | 4/2004 | Estakhri et al. |
| 6,751,155 B2 | 6/2004 | Gorobets |
| 6,757,800 B1 | 6/2004 | Estakhri et al. |
| 6,813,678 B1 | 11/2004 | Sinclair et al. |
| 6,898,662 B2 | 5/2005 | Gorobets |
| 6,912,618 B2 | 6/2005 | Estakhri et al. |
| 6,950,918 B1 | 9/2005 | Estakhri |
| 6,957,295 B1 | 10/2005 | Estakhri |
| 6,973,519 B1 | 12/2005 | Estakhri et al. |
| 6,978,342 B1 | 12/2005 | Estakhri et al. |
| 7,000,064 B2 | 2/2006 | Payne et al. |
| 7,499,966 B2 | 3/2009 | Elnozahy et al. |
| 2003/0033471 A1 | 2/2003 | Lin et al. |

FOREIGN PATENT DOCUMENTS

| | | |
|---|---|---|
| EP | 0 243 503 | 11/1987 |
| EP | 0 392 895 | 10/1990 |
| EP | 0 424 191 | 4/1991 |
| EP | 0 489 204 | 6/1992 |
| EP | 0 522 780 | 1/1993 |
| EP | 0 544 252 | 6/1993 |
| EP | 0 613 151 | 8/1994 |
| EP | 0 617 363 | 9/1994 |
| EP | 0 619 541 | 10/1994 |
| EP | 0 663 636 | 7/1995 |
| EP | 0 686 976 | 12/1995 |
| EP | 0 691 008 | 1/1996 |
| EP | 0 722 585 | 7/1996 |
| EP | 0 852 765 | 7/1998 |
| EP | 0 852 766 | 7/1998 |
| EP | 0 861 468 | 9/1998 |
| EP | 0 891 580 | 1/1999 |
| EP | 0 896 699 | 2/1999 |
| EP | 0 897 579 | 2/1999 |
| EP | 0 910 826 | 4/1999 |
| EP | 0 978 040 | 2/2000 |
| EP | 1 157 328 | 11/2001 |
| FR | 93 01908 | 8/1993 |
| GB | 2 251 323 | 7/1992 |
| GB | 2 291 990 | 2/1996 |
| GB | 2 291 991 | 2/1996 |
| GB | 2 297 637 | 8/1996 |
| GB | 2 304 428 | 3/1997 |
| GB | 2 348 991 | 10/2000 |
| GB | 2 351 822 | 1/2001 |
| GB | 2 384 072 | 7/2003 |
| GB | 2 384 337 | 7/2003 |
| GB | 2 384 338 | 7/2003 |
| GB | 2 384 883 | 8/2003 |
| GB | 2 411 499 | 8/2005 |
| IS | 117881 | 5/2003 |
| JP | 58-215794 | 12/1983 |

(56) References Cited

FOREIGN PATENT DOCUMENTS

| | | |
|---|---|---|
| JP | 58-215795 | 12/1983 |
| JP | 59-045695 | 3/1984 |
| JP | 59-162695 | 9/1984 |
| JP | 60-212900 | 10/1985 |
| JP | 61-096598 | 5/1986 |
| JP | 62-283496 | 12/1987 |
| JP | 62-283497 | 12/1987 |
| JP | 63-183700 | 7/1988 |
| JP | 1-138694 | 5/1989 |
| JP | 3-228377 | 9/1991 |
| JP | 4-057295 | 2/1992 |
| JP | 4-254994 | 9/1992 |
| JP | 4-268284 | 9/1992 |
| JP | 4-278297 | 10/1992 |
| JP | 4-332999 | 11/1992 |
| JP | 5-128877 | 5/1993 |
| JP | 5-282883 | 10/1993 |
| JP | 6-004399 | 1/1994 |
| JP | 6-036578 | 2/1994 |
| JP | 6-124175 | 5/1994 |
| JP | 6-124231 | 5/1994 |
| JP | 6-131889 | 5/1994 |
| JP | 6-132747 | 5/1994 |
| JP | 6-149395 | 5/1994 |
| JP | 6-266596 | 9/1994 |
| JP | 7-084871 | 3/1995 |
| JP | 7-093499 | 4/1995 |
| JP | 7-114499 | 5/1995 |
| JP | 7-141258 | 6/1995 |
| JP | 7-235193 | 9/1995 |
| JP | 7-311708 | 11/1995 |
| JP | 7-334996 | 12/1995 |
| JP | 8-018018 | 1/1996 |
| JP | 8-069696 | 3/1996 |
| JP | 9-147581 | 6/1997 |
| SU | 1388877 | 4/1988 |
| SU | 1408439 | 7/1988 |
| SU | 1515164 | 10/1989 |
| SU | 1541619 | 2/1990 |
| SU | 1573458 | 6/1990 |
| SU | 1686449 | 10/1991 |
| WO | WO 84/00628 | 2/1984 |
| WO | WO 94/20906 | 9/1994 |
| WO | WO 97/49056 | 6/1997 |

OTHER PUBLICATIONS

Brian Dipert and Markus Levy, Designing with Flash Memory, book, Apr. 1994, 445 pgs., Annabooks, San Diego, USA.

Science Forum, Inc., Flash Memory Symposium '95, symposium,1995, 13 pgs.; Hongo, Bunkyo-ku, Tokyo.

Ross S. Finlayson and David R. Cheriton, An Extended File Service Exploiting Write-Once Storage, article, 1987, 10 pgs. ACM.

Jason Gait, The Optical File Cabinet: A Random-Access File System for Write-Once Optical Disks, article, Jun. 1988, 12 pgs., Beaverton, Oregon.

Henry G. Baker, Memory Management, book, 1995, 19 pgs., Springer-Verlag Berlin Heidelberg, Germany.

Sape J. Mullender and Andrew S. Tanenbaum, A Distributed File Service Based on Optimistic Concurrency Control, article, 1985, 12 pgs., ACM.

Hiroshi Nakamura, Junichi Miyamoto, Kenichi Imamiya and Yoshihisa Iwata, A Novel Sense Amplifier for Flexible Voltage Operation NAND Flash Memories, symposium, 1995, VLSI Circuits Digest of Technical Papers, 2 pgs.

Hiroshi Nakamura, Junichi Miyamoto, Kenichi Imamiya, Yoshihisa Iwata, Yoshihisa Sugiura and Hideko Oodaira, A Novel Sensing Scheme with On-Chip Page Copy for Flexible Voltage NAND Flash Memories, article, Jun. 1996, 9 pgs., vol. E79-C. No. 6.

Takaaki Nozaki, Toshiaki Tanaka, Yoshiro Kijiya, Eita Kinoshita, Tatsuo Tsuchiya and Yutaka Hayashi, A 1-Mb EEPROM with MONOS Memory Cell for Semiconductor Disk Application, article, 1991, 5 pgs., Journal of Solid-State Circuits, vol. 26, No. 4.

Kai Hwang and Faye A. Briggs, Computer Architecture and Parallel Processing, book, 1984, McGraw-Hill, Inc. 2 pgs., US.

Walter Lahti and Dean McCarron, State of the Art: Magnetic VS. Optical Store Data in a Flash, article, 1990, 7 pgs., vol. 15, No. 12, McGraw-Hill. Inc., US.

Ron Wilson, Integrated Circuits; 1-Mbit flash memories seek their role in system design, article, Mar. 1, 1989, 2 pgs., No. 6, Tulsa, OK.

S. Mehroura, J.H. Yuan, R.A. Cemea, W.Y. Chien, D.C. Guteman, G. Samachisa, R.D. Noman, M. Mofidi, W. Lee, Y. Fong, A. Mihnea, E. Hann, R.W. Gregor, E.P. Eberhardt, J.R. Radosevich, K.R. Stiles, R.A. Kohler, C.W. Leung, and T.J. Mulrooney, Serial 9Mb F EEPROM for Solid State Disk Applications, symposium. 1992, 2 pgs., Mountain View, CA.

Steven H. Leibson, Nonvolatile, in-circuit-reprogrammable memories, article, Jan. 3, 1991, 12 pgs., EDN, Circle No. 12.

Ramon Caceres, Fred Douglis, Kai Li and Brian Marsh, Operating System Implications of Solid-State Mobile Computers, article, 7 pgs., Oct. 1993, Workshop on Workstation Operating Systems.

Michael Wu and Wily Zwaenepoel, A Non-Volatile, Main Memory Storage System, 12 pgs., 1994, ACM, San Jose, CA USA.

Dave Bursky, Innovative flash memories match DRAM densities: available with a choice of features, flash memories are finding homes in many systems (includes related articles on the origins of flash, and on the differences between NAND and NOR flash memories), article, May 16, 1994, 9 pgs., Electronic Design, v. 42, n. 10, The Gale Group.

Anthony Cataldo, New flash enhancements up ante. (Intel's 28F400BV-120 and 28F004BV-120, Atmel's AT29BV010 and AT29BV020, and Samsung Semiconductor's KM29V32000 *flash* memory* devices)(Product Announcement), article, Mar. 13, 1995, 4 pgs., Electronic News, v. 41, n. 2056, The Gale Group.

Sam Weber, *Flash* modules' portability, reusability, small size valued for a host of APPs-Consumer formats flocking to *flash*, article. Jul. 22, 1996, 9 pgs., Electronic Engineering Times, n. 911, CMP Media.

Toshiba, MOS Memory (Non-Volatile), 1995, Data Book.

Stan Baker, But Integration Calls for Hardware, Software Changes: Flash: designers face the dawn of a new memory age, article, Sep. 12, 2003, 5 pgs., Electronic Engineering Times, 1990, N. 619, 41, CMP Media.

Toshiba, Toshiba MOS Digital Integrated Circuit Silicon Gate CMOS, (TC58NS512DC) Mar. 21, 2001, 43 pgs., Data Book.

Toshiba Corporation, SMIL (Smartmedia Interface Library) Hardware Edition Version 1.00. Jul. 1, 2000, 36 pgs., Data Book.

Toshiba, Toshiba MOS Digital Integrated Circuit Silicon Gate. (TC58512FT), Mar. 5, 2001, 43 pgs., Data Book.

Toshiba, Toshiba MOS Digital Integrated Circuit Silicon Gate. (TC58DVM92A1FT00). Jan. 10, 2003, 44 pgs., Data Book.

35Nonvolatile Memory Technology Review, A Time of Change, Proceedings 1993 Conference, Jun. 22-24, 1993, Linthlcum Heights, MD USA.

Toshiba Corporation, SMIL (Smartmedia Interface Library) Software Edition Version 1.00, Jul. 1, 2000, 136 pgs., Data Book.

Toshiba. MOS Memory (Non-Volatile), 1996, 279 pgs., Data Book.

Dan Auclair, Optimal Solid State Disk Architecture for Portable Computers, symposium, Jul. 9, 1991, 7 pgs., SunDisk Corporation.

1992 Symposium of VLSI Circuits Digest of Technical Papers, "EEPROM for Solid State Disk Applications", S. Mehoura et al., SunDisk Corporation, Sank Clara, CA. R.W. Grepor et al., AT&T Bell Laboratories, Allentown, PA. pp. 24 and 25.

"UNIX / Linux File System Recoverability" Ontrack Data Recovery, 2001, pp. 1-2, XP002469567, www.ontrackdatarecovery.com/unix-file-recovery/.

* cited by examiner

IMAGE RESCUE

RELATED APPLICATIONS

This application is a divisional of U.S. application Ser. No. 11/654,290, titled "IMAGE RESCUE," filed Jan. 16, 2007 now U.S. Pat. No. 8,166,488, which is a continuation of U.S. application Ser. No. 10/371,930, filed Feb. 21, 2003, now U.S. Pat. No. 7,231,643, which claims the benefit of U.S. Provisional application No. 60/359,510, filed on Feb. 22, 2002, each of which is incorporated by reference in their entirety.

TECHNICAL FIELD

The present invention relates generally to the field of retrieval and recovery of information and particularly to rapid and efficient retrieval and recovery of information stored in a mass storage device, which is accessible or inaccessible to an operating system.

BACKGROUND

In modern electronic systems, storage, retrieval, and recovery of digital information plays a significant role in the operation of devices included within such systems. A common example of an electronic system is a personal computer (PC), which requires access to digital data for processing thereof to perform and execute a wide variety of tasks. Digital data may be stored in a PC either internally as in a hard disk or externally in a mass storage data device such as a digital photo reader or a compact flash reader device.

In the conventional methods of accessing digital data, as implemented in electronic systems, an application program operating under a standard commercially available operating system accesses a mass storage data device for reading and/or writing of digital data. The operating system recognizes the mass storage data device and "mounts" it as an operating system data volume, i.e., a "disk drive". The application program thereby accesses the mass storage data device at the logical level within the operating system using the operating system formatting information included within the mass storage data device.

However, the conventional methods of accessing digital data have a limitation that is encountered when the mass storage data device is for some reason corrupted. In the event of corruption of the mass storage data device, the electronic system cannot recover the digital data simply because the operating system is unable to communicate with the mass storage data device. Another limitation of the conventional methods of accessing digital data is that the application program commands the mass storage data device only with standard commands available to the operating system.

In light of the foregoing, it is desirable to develop a method and apparatus for accessing digital data even when the mass storage data device is corrupted and the operating system cannot communicate therewith. Further, the method and apparatus should not interfere with normal operations of the operating system, i.e. be transparent to the operating system. The desired method and apparatus should be able to access, retrieve, and recover information efficiently and cost-effectively.

SUMMARY

Briefly, an embodiment of the present invention includes an image rescue system having an application program for communication with a mass storage device, said application program being in communication with an operating system layer for accessing said mass storage device to read and write information. The image rescue system further includes a device driver in communication with said application program, said operating system layer and said mass storage device, said device driver for allowing said application program to access said mass storage device to read and write information by bypassing said operating system layer, said device driver for communicating with said mass storage device to allow said application program to rapidly access information in said mass storage device considered damaged by said operating system layer, said damaged information being inaccessible to said operating system layer, wherein said image rescue system accesses said mass storage device to rapidly and efficiently retrieve and recover information accessible and inaccessible to said operating system layer.

The foregoing and other objects, features and advantages of the present invention will be apparent from the following detailed description of the preferred embodiments which make reference to several figures of the drawing.

DETAILED DESCRIPTION

Figure 1:
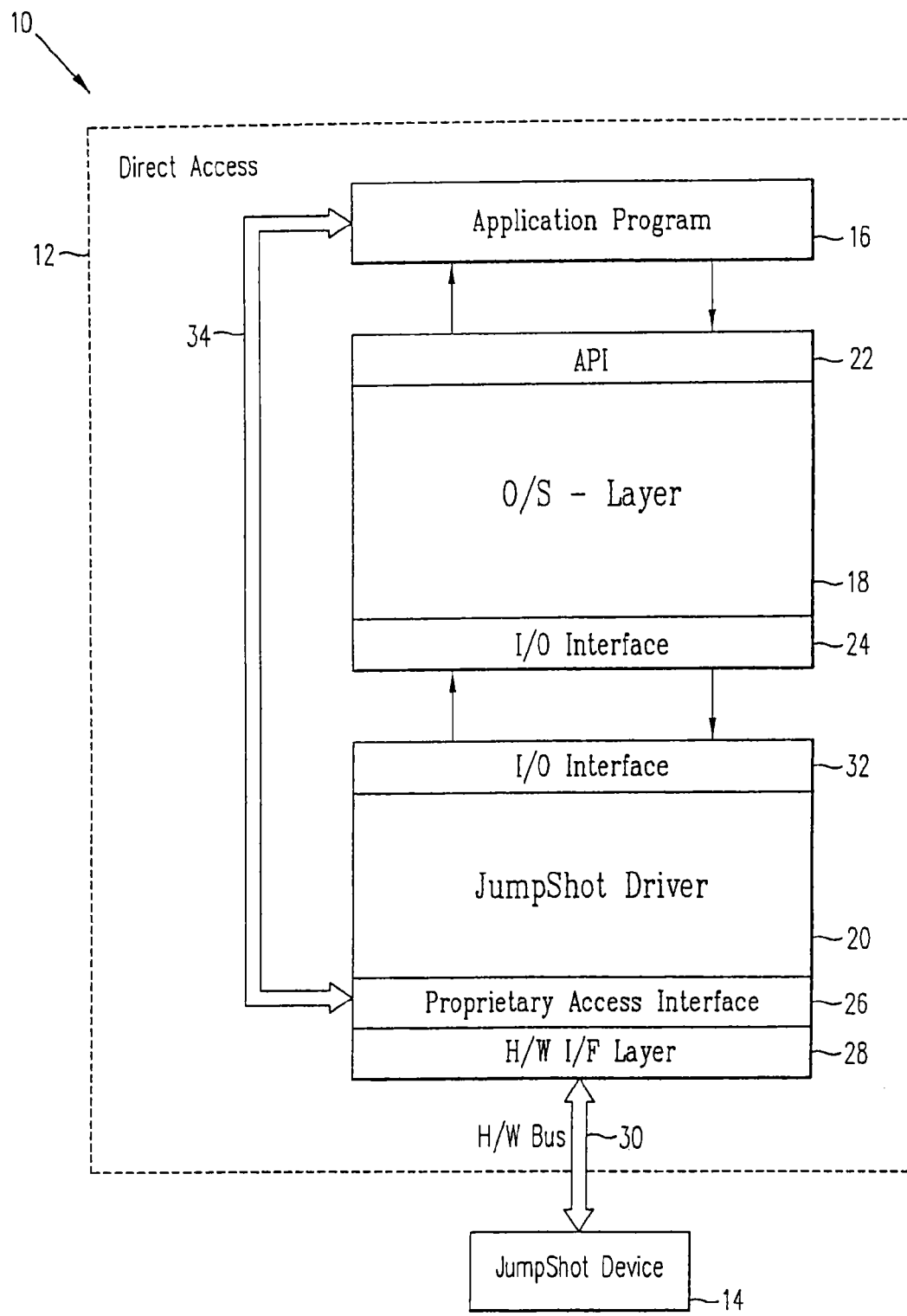
FIG. 1 shows an image rescue system 10, in accordance with an embodiment of the present invention.

The present invention employs a technique for directly accessing common mass storage data devices at the physical, rather than logical, device level; without assistance from operating system programming facilities. This allows for recovery, reconstruction and retrieval of valid user data files from a mass storage data device that the operating system would normally consider a "damaged" or corrupted mass storage data device.

The present invention allows the operating system to be extended to support the addition of an external mass storage data device to be added to the operating system as a standard system data volume or what is commonly known as a "disk drive". An application program in concert with a device driver for the mass storage data device allow for rapid retrieval of what appears to be to the operating system "lost" or corrupted data from the mass storage data device.

In one embodiment of the present invention, the "mass storage data device" for which the application and driver is designed is Lexar Media, Inc. brand compact Flash cards connected to a personal computer (PC) or a Macintosh computer (Mac) via a universal serial bus (USB) 1.x connection via a Lexar Media brand Jumpshot cable. The application is not limited to this type of mass storage data device or this type of connection to the computer. The techniques described below will work for almost any mass storage data device, any storage technology, which is connected to the host computer in almost any way.

As will be explained in further detail with respect to FIG. 1, the application program employs a novel I/O access technique to allow the application program that is operating under a standard commercially available operating system to access a mass storage data device for reading or writing, regardless of whether or not the operating system recognizes the mass storage data device as a valid operating system formatted storage device such as a disk volume. That is, communication with the mass storage data device is possible through the Lexar application program whether or not the operating system recognizes the mass storage data device and "mounts" it as an operating system data volume, i.e. "disk drive". The application can access the mass storage data device at the physical device level, as opposed to what is commonly known as the logical device level within the operating system. This is accomplished by a unique and novel method within the Lexar Media operating system extension device driver that supports the mass storage data device. The device driver is commonly supplied by the mass storage data device manufacturer or the author of the application program utility, i.e. Lexar Media. The technique employed is to include an additional proprietary layer of program interface within the standard device driver. This additional layer provides added functionality to allow an application program that is aware of this added interface to directly access the facilities provided within the device driver while circumventing the operating system. The operating system is completely unaware of this added proprietary access interface within the device driver. The device driver appears to the operating system to be a "standard" device driver in all respects; the operating system is completely unaware of the additional proprietary interface. The application program is able to locate the proprietary interface within the device driver using standard operating system functions and procedures. Once the proprietary interface is located and "attached" to the application program, the application program can call the functions and procedures located within the proprietary interface. The functions and procedures within the proprietary interface are "invisible" to the operating system and do not interfere with the operating system and its normal interaction with the Lexar device driver. The functions and procedures within the proprietary interface allow the Lexar application program to access the mass storage data device at the physical level; allowing the application program to command the mass storage data device with standard commands along with vendor unique commands; thus allowing the application program to access information and data areas that are not normally accessible to the operating system.

Referring now to FIG. 1, an image rescue system 10 is shown to include a personal computer (PC) 12 coupled to a device 14 in accordance with an embodiment of the present invention. The device 14 can be one of many types of devices, examples of which are compact flash reader devices, a digital photo reader, a Jumpshot product manufactured by Lexar Media, Inc. of Fremont, Calif., or any other type of mass storage product.

The PC 12 is shown to include an application program 16, which is in communication with the operating system layer 18 through an application program interface 22. The operating system layer 18 is shown to be in communication with a driver 20 through an operating system input/output (I/O) interface 24 and a driver I/O interface 32. The driver 20 is shown to include an access interface 26, which causes direct communication with the device 14 through a hardware interface layer 28 and the hardware bus 30. As shown in FIG. 1, the application program 16 is in direct communication with the access interface 26 through the direct access bus 34 thereby circumventing the operating system layer 18.

In various embodiments of the present invention, the hardware bus 30 conforms to different standards and is thus referred to as a different interface. Examples of the different types of hardware bus 30 are USB, PCMCIA, IDE, mass storage interface, fire wire and blue tooth.

In prior art methods, the application program must communicate through the operating system layer to the driver. The problem with such prior art methods is that in the event of some sort of corruption of the device 14, the system can not recover the device simply because the operating system is unable to communicate with the device. In the present invention however, the driver 20 identifies the device 14 and recovers the information previously stored in the device even though the device 14 includes corrupt information. It should be noted that different drivers 20 are employed for different types of devices that device 14 can be. Similarly, the access interface 26 includes different extensions based upon the kind of device employed as device 14. Bypassing the operating system layer 18 enables establishing communication with devices, as device 14, that the PC 12 is not able to communicate with if the operating system layer 18 is not bypassed.

Referring still to FIG. 1, the application program 16 rapidly searches and recovers certain types of user data files from a corrupted or non-corrupted mass storage data device, i.e. device 14. The device 14 is searched at the physical "raw" device level without the benefit of using the operating system layer 18 formatting information that may or may not be included within the device 14.

The technique employed searches for certain data file types that have distinguishable data "headers". The "header" area includes data patterns that are unique to certain file types, for example, but not limited to, joint photographic experts group (JPEG) files or tagged image file format (TIFF) files. The application program also utilizes information gathered from the mass storage data device to formulate an algorithm to allow for an intelligent search of the mass storage data device instead of a "brute force" byte-by-byte search. The application program first directly queries the mass storage data device for its device characteristics using the access technique described hereinabove. This information is used to establish the absolute size in bytes of the device 14 along with obtaining its physical block size.

The physical block size, described in units of bytes, is the smallest unit of access that can be read or written to the mass storage data device. This unit is usually described as a binary multiple of a number of bytes, usually in the range of hundreds or thousands of bytes. The application will then attempt to read the operating system formatting information on the mass storage data device. This information is operating system dependent, the application knows what operating system it is running under and interprets the data accordingly. Since the formatting data may be damaged or corrupted, the application program attempts to determine if the formatting information is valid by examining certain operating system specific parameters contained within the formatting information for reasonable values.

Figure 2:
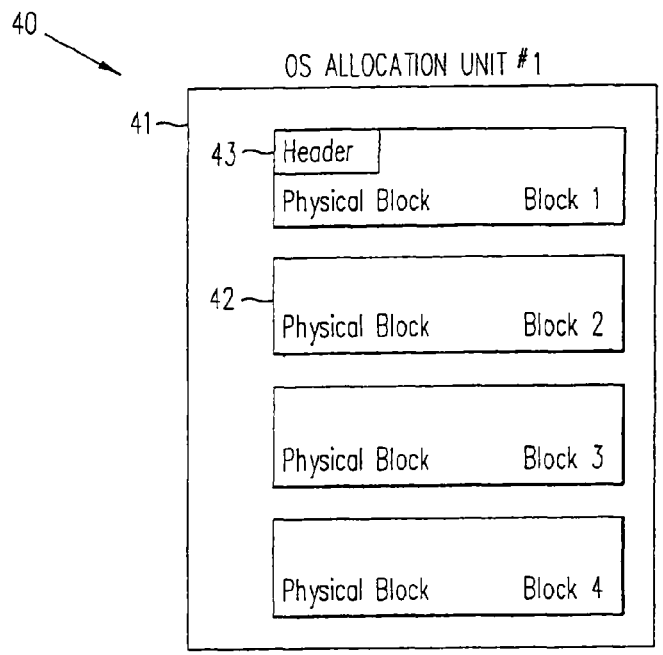
FIG. 2 shows a representation of physical blocks and the file allocation grouping as used by the operating system, in accordance with an embodiment of the present invention.
Figure 2:
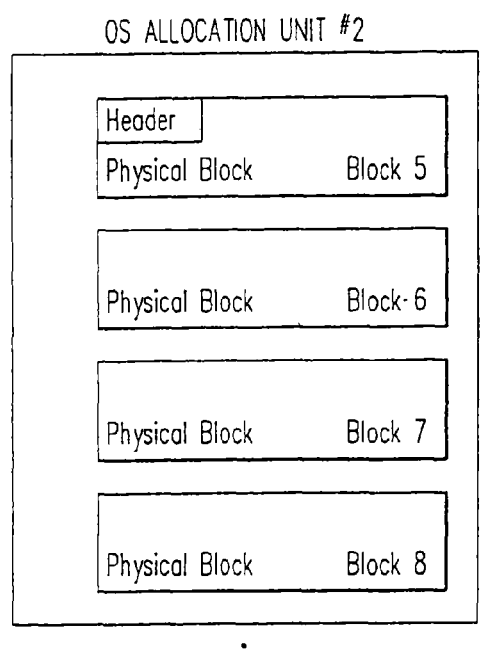
Figure 2:
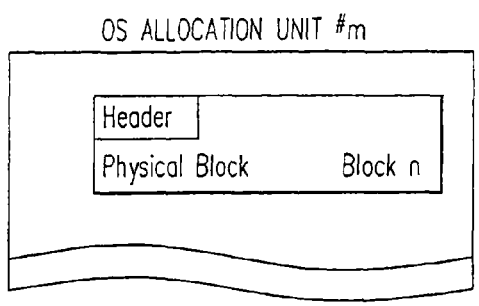

FIG. 2 shows a representation of "search allocation units" 40. In FIG. 2, after investigating the formatting information, if the application determines that the information is valid, it will retrieve the operating system "file allocation unit" 41. This value is the smallest sized data block that the operating system will access file data on the mass storage data device. This value is usually described in units of physical block size 42; therefore the file allocation unit 41 is a multiple of physical block size; usually in the range of thousands of bytes. The application program will then use the largest determined block size 42 as its search allocation unit; this will be either the physical block size 42 or the operating system allocation unit size 41.

Knowing that the operating system will only write file data in units of file allocation unit sizes, the application program searches for pertinent file header information 43 at the boundaries of these units; at the very most, the file allocation unit 41; at the very least the physical block size 42 of the mass storage data device.

This, therefore, will substantially increase the speed of the search as opposed to a byte-by-byte search on the mass storage data device. It is only necessary to examine the beginning of the search allocation units for the file header information 43. If no match of header information is found, the search algorithm skips to the beginning of the next search allocation unit on the mass storage data device. This process is continued until all areas on the mass storage data device have been examined.

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. An image rescue system comprising:
    a personal computer having an operating system layer and in communication with a device through a device driver, wherein the device driver has a driver input/output interface for communication with an application program through the operating system layer, and an access interface for providing the application program direct access to the device driver while bypassing the operating system layer;
    wherein the driver input/output interface is configured to facilitate communicating from the application program to the device using a first set of commands available to the operating system layer;
    wherein the access interface is configured to facilitate communicating from the application program to the device using a second set of commands not available to the operating system layer; and
    wherein the second set of commands facilitate access to information of the device considered damaged by the operating system layer, the information considered damaged by the operating system layer being inaccessible using the first set of commands.

2. The image rescue system of claim 1, further including a hardware interface layer in communication with the access interface.

3. The image rescue system of claim 2, further including a hardware bus coupled to cause communication between the device and the hardware interface layer.

4. The image rescue system of claim 1, wherein the device is a compact flash reader device.

5. The image rescue system of claim 1, wherein the device is a digital photo reader.

6. The image rescue system of claim 1, wherein the access interface is configured to provide access to information in the device that is considered damaged by the operating system layer.

7. The image rescue system of claim 1, wherein the access interface is configured to provide access to information in the device without using formatting information of the operating system layer.

8. The image rescue system of claim 1, wherein communication between the application program and the device driver using the access interface comprises different commands than communication between the application program and the device driver using the driver input/output interface.

9. An image rescue system comprising:
    an operating system layer in communication with an application program;
    a device driver having a first interface for communicating with the application program through the operating system layer, and having a second interface for communicating with the application program without assistance from programming facilities of the operating system layer; and
    a hardware bus configured for communicating between the device driver and a mass storage data device;
    wherein the first interface is configured to facilitate communicating from the application program to the mass storage data device using a first set of commands available to the operating system layer; and
    wherein the second interface is configured to facilitate communicating from the application program to the mass storage data device using a second set of commands in addition to the first set of commands, wherein the second set of commands is not available to the operating system.

10. The image rescue system of claim 9, wherein the second interface of the driver is configured to facilitate access to areas of the mass storage device that are considered damaged by the operating system layer.

11. The image rescue system of claim 9, further comprising the mass storage data device.

12. The image rescue system of claim 11, wherein the mass storage data device is a compact flash card.

13. The image rescue system of claim 9, wherein the application program is configured to access the mass storage data device at a logical device level when communicating with the mass storage data device through the first interface of the device driver, and to access the mass storage data device at a physical device level when communicating with the mass storage data device through the second interface of the device driver.

14. The image rescue system of claim 9, wherein the application program is configured to access the mass storage data device through the second interface of the device driver even if the operating system layer does not recognize the mass storage data device as a valid operating system formatted storage device.

15. The image rescue system of claim 9, wherein the hardware bus is selected from the group consisting of USB, PCMCIA, IDE, mass storage interface, fire wire and blue tooth buses.

16. The image rescue system of claim 9, wherein the image rescue system is a personal computer.

17. The image rescue system of claim 9, wherein the second interface is configured to provide access to information in the mass storage data device without using formatting information of the operating system layer.

18. The image rescue system of claim 9, wherein functions and procedures within the second interface do not interfere with normal interaction between the operating system layer and the device driver.

* * * * *